US010480569B2

(12) United States Patent
Merg et al.

(10) Patent No.: US 10,480,569 B2
(45) Date of Patent: Nov. 19, 2019

(54) HYBRID LINED TRUNNION BEARING FOR AIRCRAFT LANDING GEAR

(71) Applicant: Schaublin SA, Delemont (CH)

(72) Inventors: Maxime Merg, Bernwiller (FR); Dave Coombe, Somerset (GB)

(73) Assignee: Schaublin SA, Delemont (CH)

( * ) Notice: Subject to any disclaimer, the term of this patent is extended or adjusted under 35 U.S.C. 154(b) by 0 days.

(21) Appl. No.: 16/007,404

(22) Filed: Jun. 13, 2018

(65) Prior Publication Data

US 2018/0363697 A1    Dec. 20, 2018

Related U.S. Application Data

(60) Provisional application No. 62/520,259, filed on Jun. 15, 2017.

(51) Int. Cl.
*F16C 17/10* (2006.01)
*F16C 33/10* (2006.01)
*F16C 11/06* (2006.01)

(52) U.S. Cl.
CPC ........ *F16C 17/102* (2013.01); *F16C 33/1065* (2013.01)

(58) Field of Classification Search
CPC .............. F16C 33/7889; F16C 33/7823; F16C 19/184; F16C 33/102; F16C 33/1065; F16C 33/109; F16C 33/125; F16C 33/74; F16C 11/0666; F16C 11/068; F16C 23/043; F16C 23/045; F16C 23/046; F16C 23/048; F16C 2326/43
See application file for complete search history.

(56) References Cited

U.S. PATENT DOCUMENTS

| 1,516,251 | A |   | 11/1924 | Swenson |                 |
|-----------|---|---|---------|---------|-----------------|
| 1,694,438 | A | * | 12/1928 | Chinn   | F16C 23/045     |
|           |   |   |         |         | 384/209         |
| 1,940,301 | A | * | 12/1933 | Grobel  | F16C 23/045     |
|           |   |   |         |         | 384/291         |
| 2,125,446 | A | * | 8/1938  | Hurtt   | B21B 31/076     |
|           |   |   |         |         | 277/585         |

(Continued)

FOREIGN PATENT DOCUMENTS

| CN | 100394046   | 6/2008 |
| EP | 0372559 A1  | 6/1990 |

(Continued)

OTHER PUBLICATIONS

Lubron AQ Self-Lubricating Bearings, Lubron Bearing Systems, Lubron HQ, Offshore/Marine, Catalog 0503, 2005, pp. 1-19, Huntington Beach, CA.

(Continued)

*Primary Examiner* — Alan B Waits
(74) *Attorney, Agent, or Firm* — Murtha Cullina LLP

(57) ABSTRACT

A trunnion bearing includes an inner ring having exterior and interior surfaces; and an outer ring having interior and exterior surfaces. A portion of the inner ring is disposed in the outer ring. A lubricious liner is disposed between the inner ring and the outer ring. The trunnion bearing includes a bushing disposed in the inner ring. The bushing has a lubricant reservoir formed therein to dispense a lubricant therefrom.

15 Claims, 8 Drawing Sheets

(56) References Cited

U.S. PATENT DOCUMENTS

| | | | | |
|---|---|---|---|---|
| 2,172,486 | A * | 9/1939 | Wallgren | B21B 31/07 384/302 |
| 2,475,393 | A * | 7/1949 | Keahey | F16C 11/0614 384/212 |
| 2,776,173 | A * | 1/1957 | Rudy | F16C 33/74 277/346 |
| 3,044,838 | A * | 7/1962 | Winer | F16C 23/045 384/213 |
| 3,207,210 | A | 9/1965 | Klovers | |
| 3,243,212 | A * | 3/1966 | May | F16C 33/14 285/190 |
| 3,429,624 | A | 2/1969 | Freshwater et al. | |
| 3,439,964 | A * | 4/1969 | Stone | F16C 23/045 384/208 |
| 3,445,908 | A * | 5/1969 | Straub | B21K 25/00 29/446 |
| 3,769,672 | A * | 11/1973 | Eklund | B23P 6/00 29/402.08 |
| 3,888,554 | A * | 6/1975 | McCloskey | F16C 23/045 384/212 |
| 3,909,087 | A | 9/1975 | Cairns | |
| 3,913,990 | A * | 10/1975 | Eklund | B23P 6/00 384/208 |
| 3,929,396 | A | 12/1975 | Orkin et al. | |
| 4,005,514 | A * | 2/1977 | McCloskey | F16C 23/045 29/898.043 |
| 4,005,916 | A * | 2/1977 | Dillon | B63H 23/321 384/117 |
| 4,031,967 | A * | 6/1977 | Atherton | E02F 3/764 172/795 |
| 4,077,681 | A * | 3/1978 | McCloskey | F16C 23/045 29/898.052 |
| 4,199,199 | A | 4/1980 | Granda | |
| 4,213,512 | A * | 7/1980 | Mazziotti | F16C 3/03 180/233 |
| 4,247,512 | A * | 1/1981 | Lobeck | B29C 45/14754 264/242 |
| 4,516,491 | A * | 5/1985 | Winter | B21B 13/023 100/158 R |
| 4,765,757 | A * | 8/1988 | Hartl | F16C 23/045 384/213 |
| 4,848,934 | A * | 7/1989 | Blakely | F16C 33/102 384/206 |
| 4,966,471 | A | 10/1990 | Trozzi | |
| 5,061,087 | A * | 10/1991 | Roerig | D21G 1/0226 384/192 |
| 5,172,981 | A * | 12/1992 | Williams | F16C 23/045 384/108 |
| 5,238,310 | A * | 8/1993 | Layfield | F16C 23/045 384/145 |
| 5,468,308 | A | 11/1995 | Braza et al. | |
| 5,660,482 | A * | 8/1997 | Newley | F16C 23/045 384/192 |
| 5,697,390 | A | 12/1997 | Garrison et al. | |
| 5,707,718 | A | 1/1998 | Matsukawa et al. | |
| 5,762,424 | A * | 6/1998 | Harris | F16C 23/045 384/299 |
| 6,729,763 | B2 * | 5/2004 | Post | F16C 23/045 384/213 |
| 6,881,151 | B1 | 4/2005 | Jantz et al. | |
| 7,264,398 | B2 | 9/2007 | Davies et al. | |
| 7,604,412 | B2 | 10/2009 | Smith | |
| 7,648,282 | B2 * | 1/2010 | Shore | F16C 35/02 384/192 |
| 8,851,755 | B2 * | 10/2014 | Porter | F16C 23/045 384/203 |
| 8,926,185 | B2 * | 1/2015 | Gaumer | F16C 33/02 384/145 |
| 9,670,954 | B2 | 6/2017 | Turmeau et al. | |
| 9,695,869 | B2 * | 7/2017 | Blachon | F16C 23/046 |
| 2003/0063826 | A1 * | 4/2003 | Cevasco | F16C 17/10 384/537 |
| 2004/0042698 | A1 * | 3/2004 | Yamamoto | F16C 17/02 384/291 |
| 2006/0045399 | A1 * | 3/2006 | Essam | F16C 23/045 384/208 |
| 2007/0009189 | A1 | 1/2007 | Smith | |
| 2008/0040886 | A1 * | 2/2008 | Arnold | B64C 9/16 16/275 |
| 2009/0010580 | A1 * | 1/2009 | Gaumer | F16C 33/02 384/322 |
| 2012/0141052 | A1 * | 6/2012 | Drew | F16C 23/045 384/13 |
| 2012/0294557 | A1 | 11/2012 | Soelch et al. | |
| 2013/0033013 | A1 * | 2/2013 | Voisine | B62D 55/092 280/28.5 |
| 2013/0142463 | A1 * | 6/2013 | Gaumer | F16C 33/02 384/145 |
| 2014/0093198 | A1 * | 4/2014 | Voisine | F16C 33/102 384/137 |
| 2014/0158016 | A1 | 6/2014 | Voisine | |
| 2014/0254965 | A1 * | 9/2014 | Giegel | F16C 33/201 384/276 |
| 2015/0137486 | A1 * | 5/2015 | Smith | F16C 33/1065 280/511 |
| 2015/0337896 | A1 * | 11/2015 | Dayot | F16C 23/043 384/192 |
| 2015/0362019 | A1 * | 12/2015 | Polanco | F16C 11/0614 384/146 |
| 2016/0097425 | A1 * | 4/2016 | Charmillot | F16C 35/077 384/570 |
| 2016/0348720 | A1 | 12/2016 | Drew et al. | |
| 2017/0349851 | A1 * | 12/2017 | Tohyama | F16C 11/0614 |

FOREIGN PATENT DOCUMENTS

| | | |
|---|---|---|
| EP | 1431597 A1 | 6/2004 |
| EP | 1775488 A1 | 4/2007 |
| EP | 2812590 A1 | 12/2014 |
| WO | 2009135094 A1 | 11/2009 |
| WO | 2012078505 A1 | 6/2012 |
| WO | 2012158408 A1 | 11/2012 |
| WO | 2013117238 A1 | 8/2013 |

OTHER PUBLICATIONS

EP Communication issued in corresponding EP Application No. 18177913.3, dated Nov. 23, 2018, pp. 1-8.

* cited by examiner

HYBRID LINED TRUNNION BEARING FOR AIRCRAFT LANDING GEAR

CROSS REFERENCE TO RELATED APPLICATIONS

This application is a non-provisional application of, and claims priority to, U.S. Provisional Application No. 62/520,259, entitled "Hybrid Lined Trunnion Bearing for Aircraft Landing Gear", filed on Jun. 15, 2017, the entirety of which is incorporated by reference herein.

FIELD OF THE INVENTION

This invention relates to a trunnion bearing for aircraft landing gear, and more particularly to a trunnion bearing having an inner ring disposed for rotation in an outer ring and a lubricious liner disposed between the inner ring and the outer ring, and a bushing disposed in the inner ring, the bushing having a lubrication reservoir therein. The present invention also relates to a trunnion bearing that has an inner ring disposed for rotation in an outer ring and a lubricious liner disposed between the inner ring and the outer ring, the lubricious liner having a lubrication reservoir therein.

BACKGROUND

Aircraft landing gear are designed to support the load of the aircraft when the aircraft is on the ground. The landing gear is attached to structural members of the aircraft. However, the landing gear is retracted into the aircraft during flight, for example by pivoting the landing gear into the aircraft via an actuation assembly. Typical actuation assemblies include multiple linkages pivotally connected to one another, the structural members of the aircraft and one or more actuators, by one or more bearings. The bearings typically include an inner ring mounted in an outer ring each of which have spherical bearing surfaces that slidingly engage one another. The inner ring of such bearings may be rotatingly mounted to a shaft in the actuation assembly or extending from the aircraft structure. However, such bearings are known to wear and require periodic maintenance for proper low torque operation.

The prior art bearings typically include corrosion resistant (CRES) stainless steel outer rings with copper alloy inner rings. However, such prior art bearings are heavy and tend to wear rapidly due to high friction experienced during misalignment of the inner ring relative to the outer ring.

Thus, there is a need for an improved bearing for aircraft landing gear that operates at low torques and requires essentially no maintenance.

SUMMARY

There is disclosed herein a trunnion bearing that includes an inner ring which has a first exterior surface and a first interior surface. The trunnion is configured for use in aircraft landing gear. The first exterior surface has a spherical contour. The trunnion bearing includes an outer ring that has a second interior surface and a second exterior surface. The second interior surface has a spherical contour. A portion of the inner ring is disposed in the outer ring. A lubricious liner (e.g., a self-lubricating liner) is disposed between the first exterior surface of the inner ring and the second interior surface of the outer ring, The trunnion bearing includes a bushing that has a third exterior surface and a third interior surface. The third exterior surface has a contour complementary to that of the first interior surface of the inner ring. The third interior surface is substantially cylindrical and has one or more lubricant reservoirs formed therein (e.g., grooves such as spiral groove configurations). The lubricant reservoir is configured to dispense a first lubricant therefrom.

In one embodiment, the lubricous liner is secured to the second interior surface of the outer ring and the lubricious liner is in sliding engagement with the first exterior surface of the inner ring.

In one embodiment, the trunnion bearing includes a wiper ring disposed in the third interior surface of the bushing. The wiper ring is configured to seal the first lubricant between the third interior surface and a shaft rotatingly mounted in the bushing.

In one embodiment, the inner ring is a split ring having at least two axial splits creating at least a first inner ring segment and a second inner ring segment that are abutted against one another.

In one embodiment, the inner ring is manufactured from a titanium alloy.

In one embodiment, the outer ring is manufactured from a titanium alloy.

In one embodiment, the bushing is manufactured from a copper based alloy.

In one embodiment, a portion of the inner ring is coated with a titanium nitride material, applied thereto, for example, via a physical vapor deposition process.

In one embodiment, the inner ring is secured to the bushing via at least one of swaging, staking, pinning, thermal fitting and/or interference press fitting.

In one embodiment, the trunnion bearing includes one or more recesses in the lubricious liner which are configured as a second lubricant reservoir for dispensing a second lubricant between the lubricious liner and the first exterior surface of the inner ring. In one embodiment, the second lubricant (e.g., silicone grease) is disposed between the first exterior surface of the inner ring and the lubricious liner.

In one embodiment, the trunnion bearing includes one or more seals (e.g., O-rings, for example, made from a fluorosilicone material) that are in sealing engagement with the inner ring and the outer ring.

There is further disclosed herein a trunnion bearing that includes an inner ring that has a first exterior surface and a first interior surface. The first exterior surface has a spherical contour. The trunnion bearing includes an outer ring that has a second interior surface and a second exterior surface. The second interior surface has a spherical contour. A portion of the inner ring is disposed in the outer ring. A lubricious liner (e.g., self-lubricating liner) is disposed between the first exterior surface of the inner ring and the second interior surface of the outer ring. One or more recesses are formed in the lubricious liner. The recess is configured as a lubricant reservoir for dispensing the second lubricant between the lubricious liner and the first exterior surface of the inner ring.

In one embodiment, the second lubricant (e.g., silicone grease) is disposed between the first surface of the inner ring and the lubricious liner.

In one embodiment, one or more seals (e.g., O-rings, for example, made from a fluorosilicone material) are in sealing engagement with the inner ring and the outer ring.

There is disclosed herein a trunnion bearing that includes an inner ring with a first exterior surface and a first interior surface. The first exterior surface has a spherical contour. The trunnion bearing includes an outer ring with a second interior surface and a second exterior surface. The second interior surface has a spherical contour. The inner ring is at least partially in the outer ring. A lubricious liner is between the first exterior surface of the inner ring and the second interior surface of the outer ring. The trunnion bearing has one or both of the following described (1) bushing and/or (2) recess in the liner.

The bushing has a third exterior surface and a third interior surface. The third exterior surface has a contour complementary to that of the first interior surface of the inner ring. The third exterior surface engages the first interior surface. The third interior surface is substantially cylindrical and has at least one first lubricant reservoir formed therein that is configured to dispense a first lubricant.

One or more recesses are formed in the lubricious liner. The recesses are configured as a lubricant reservoir for dispensing a second lubricant between the lubricious liner and the first exterior surface of the inner ring.

In one embodiment, the lubricious liner is secured to the second interior surface of the outer ring and the lubricious liner is in sliding engagement with the first exterior surface of the inner ring.

In one embodiment, the first lubricant reservoir is at least one groove formed in the third interior surface of the bushing.

In one embodiment, the groove has a spiral configuration.

In one embodiment, a wiper ring is disposed in the third interior surface of the bushing. The wiper ring seals the first lubricant between the third interior surface and a shaft rotatingly mounted in the bushing.

In one embodiment, the inner ring is a split ring having at least two axial splits that create at least a first inner ring segment and a second inner ring segment that are abutted against one another.

In one embodiment, the inner ring is manufactured from a titanium alloy.

In one embodiment, the outer ring is manufactured from a titanium alloy.

In one embodiment the bushing is manufactured from a copper based alloy.

In one embodiment, at least a portion of the inner ring is coated with a titanium nitride material. The titanium nitride material is preferably applied via a physical vapor deposition process.

In one embodiment, the inner ring is secured to the bushing via swaging, staking, pinning, thermal fitting and/or interference press fitting.

In one embodiment, at least one seal is in sealing engagement with the inner ring and the outer ring. The seal is preferably an O-ring made from fluorosilicone.

In one embodiment, a second lubricant is disposed between the first exterior surface of the inner ring and the lubricious liner.

In one embodiment, the second lubricant is a silicone grease.

In one embodiment, the seal (95) that is in sealing engagement with the inner ring and the outer ring is made from fluorosilicone.

In one embodiment, the seal is an O-ring.

In one embodiment, a barrier replenishes or discharges the second lubricant from the trunnion bearing.

DETAILED DESCRIPTION OF THE INVENTION

Figure 1:
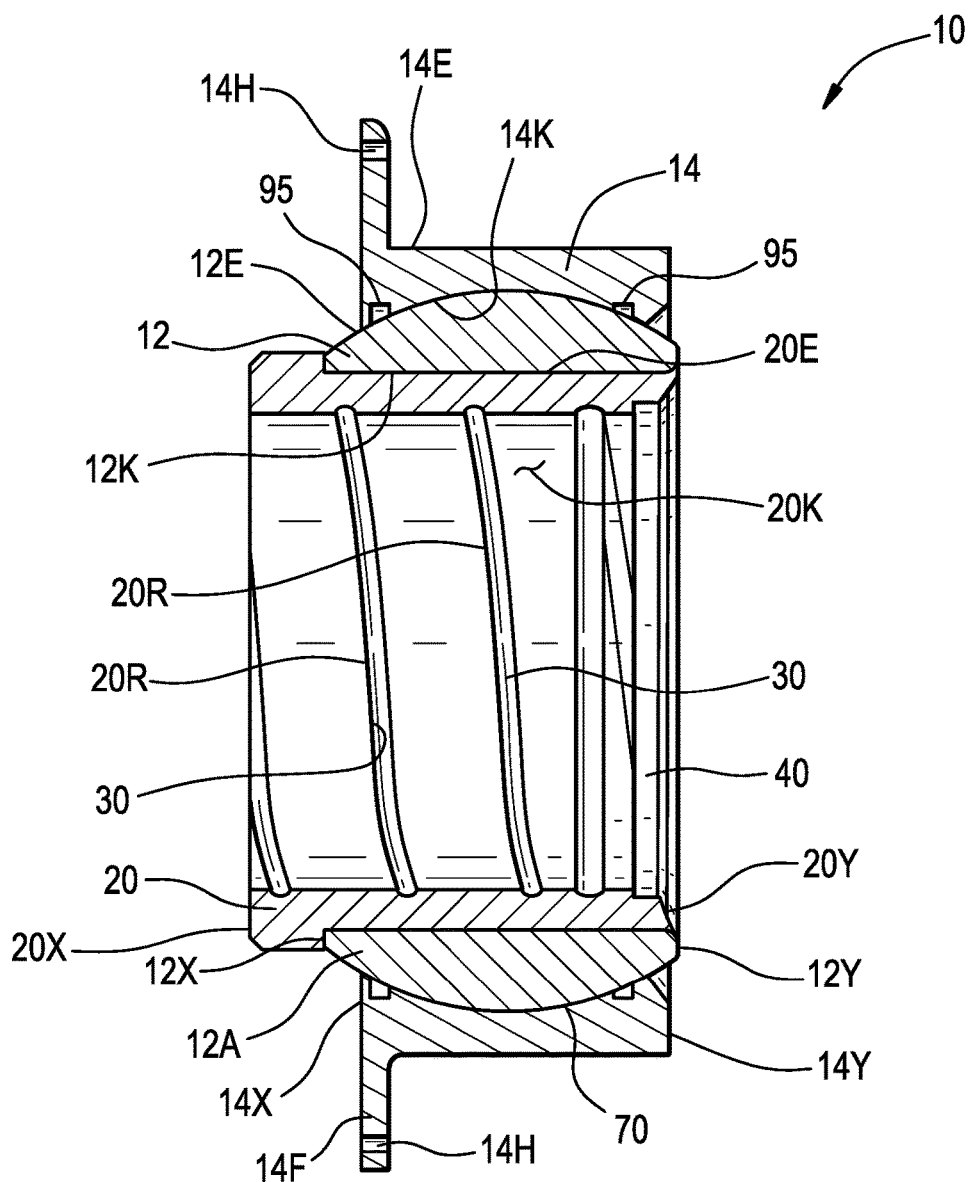
FIG. 1 is a cross sectional view of the trunnion bearing of the present invention.
Figure 2:
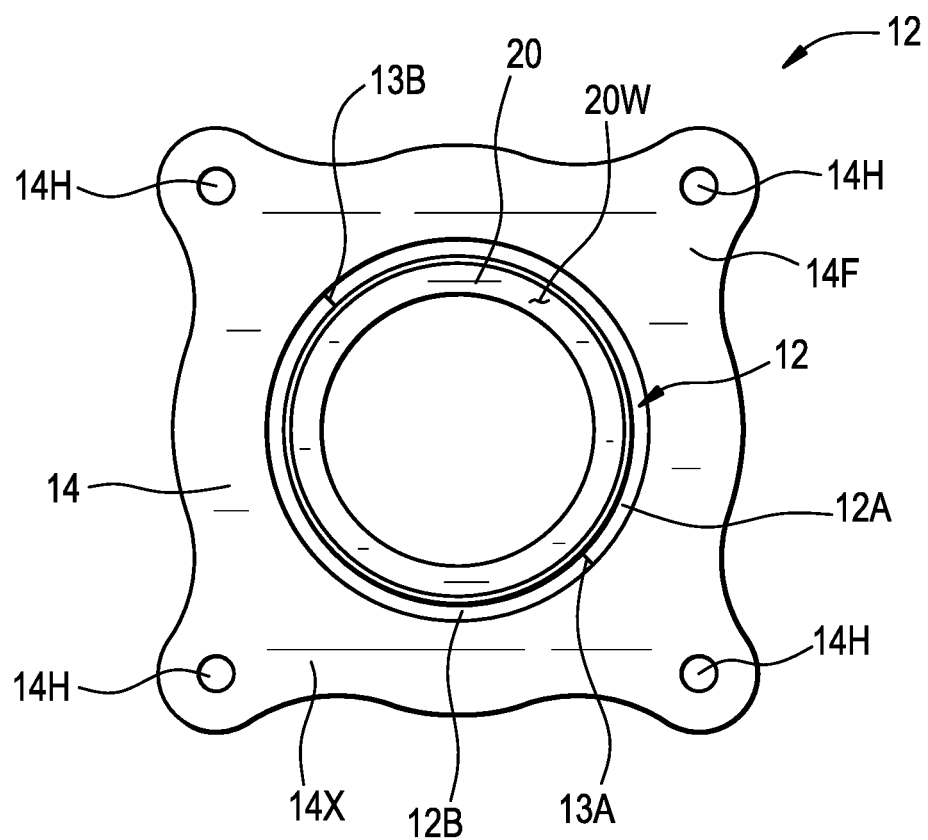
FIG. 2 is an end view of the trunnion bearing of FIG. 1.

Referring to FIG. 1, a trunnion bearing is generally designated by the numeral 10. The trunnion bearing 10 has utility in aircraft landing gear as well as other applications. The trunnion bearing 10 includes an inner ring 12 having a first exterior surface 12E and a first interior surface 12K. The inner ring 12 extends between a first axial end 12X and a second axial end 12Y thereof. The first exterior surface 12E has a spherical contour. In one embodiment, the inner ring 12 is manufactured from a titanium alloy, such as Ti-6Al-4V (UNS R56500; ASTM Grade 5 titanium; AMS 4967; 5.50-6.75 weight percent Al, 3.50-4.50 weight percent V, remainder Ti) or Ti555 (Ti-5Al-5Mo-5V-3Cr-0.6Fe; 5 weight percent Al, 5 weight percent Mo, 5 weight percent Cr, 0.6 weight percent Fe, remainder Ti). In one embodiment, at least a portion (e.g., any or all of the first exterior surface 12E, first interior surface 12K, the first axial end 12X and the second axial end 12Y of the inner ring 12) of the inner ring 12 is or are coated with a titanium nitride material. For example, the titanium nitride material is applied via a physical vapor deposition process. The inner ring 12 is a two-piece split configuration in which the inner ring 12 has two axial splits 13A and 13B creating a first inner ring segment 12A and a second inner ring segment 12B that are abutted against one another at the splits 13A and 13B, as shown in FIG. 2. Use of the two-piece split configuration having the two axial splits 13A and 13B creating the first inner ring segment 12A and the second inner ring segment 12B allows the inner ring 13 to be assembled in the outer ring 14. While the inner ring 12 is shown and described as having the two inner segments 12A and 12B with the two splits 13A and 13B, the present invention is not limited in this regard as the inner ring 12 may have more than two segments and splits.

As shown in FIG. 1, the trunnion bearing 10 includes an outer ring 14 that has a second interior surface 14K and a second exterior surface 14E. The outer ring 14 extends between a first end 14X and a second end 14Y thereof. The second interior surface 14K has a spherical contour. A portion of the inner ring 12 is disposed in the outer ring 14. The outer ring 14 includes a mounting flange 14F that extends radially outward from the exterior surface 14E of the outer ring 14, at the first end 14X of the outer ring 14. The mounting flange 14F has four holes 14H extending therethrough for receiving fasteners (not shown). In one embodiment, the outer ring 14 is manufactured from a titanium alloy, such as Ti-6Al-4V (UNS R56500; ASTM Grade 5 titanium; AMS 4967; 5.50-6.75 weight percent Al, 3.50-4.50 weight percent V, remainder Ti) or Ti555 (Ti-5Al-5Mo-5V-3Cr-0.6Fe; 5 weight percent Al, 5 weight percent Mo, 5 weight percent Cr, 0.6 weight percent Fe, remainder Ti). In one embodiment, at least a portion of the outer ring 14 is coated with a titanium nitride material. For example, the titanium nitride material is applied via a physical vapor deposition process.

Figure 3A:
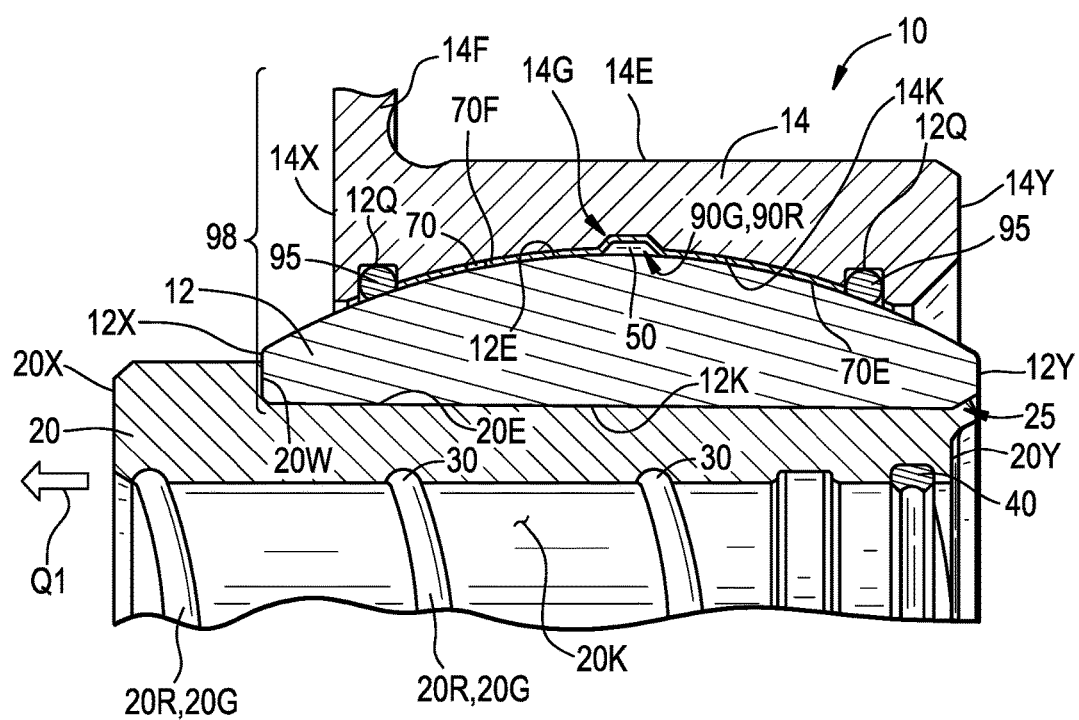
FIG. 3A is an enlarged cross sectional view of a portion of the trunnion bearing of FIG. 1.

As shown in FIGS. 1 and 3A, the trunnion bearing 10 has a lubricious liner 70 (e.g., a self-lubricating liner) disposed between the first exterior surface 12E of the inner ring 12 and the second interior surface 14K of the outer ring 14. The lubricious liner 70 has a surface 70F that is secured to the second interior surface 14K of the outer ring 14. The lubricious liner 70 has a surface 70E that is in sliding engagement with the first exterior surface 12E of the inner ring 12. While the surface 70F of the lubricious liner 70 is described as being secured to the second interior surface 14K of the outer ring 14 and the surface 70E is in sliding engagement with the first exterior surface 12E of the inner ring 12, the present invention is not limited in this regard, as the surface 70E of the lubricious liner 70 may be secured to the exterior surface 12E of the inner ring 12 and with surface 70F of the liner 70 being in sliding engagement with the interior surface 14K of the outer ring 14.

The lubricious liner 70 is manufactured from a material having low friction characteristics or qualities. The lubricious liner 70 (e.g., a self-lubricating liner) is machinable to achieve final fit-up dimensions for installation purposes. In one embodiment, the lubricious liner 70 is manufactured from Uniflon® HP and/or Uniflon® HP-A brand liner materials. Uniflon® is a trademark of Roller Bearing Company of America®. Uniflon® brand liners are made from a mixture of polymeric resin systems, combined with polytetrafluoroethylene (PTFE), and other lubricating materials. Uniflon® brand liners are molded, machinable and self-lubricating to achieve low friction and low wear rates.

Figure 4:
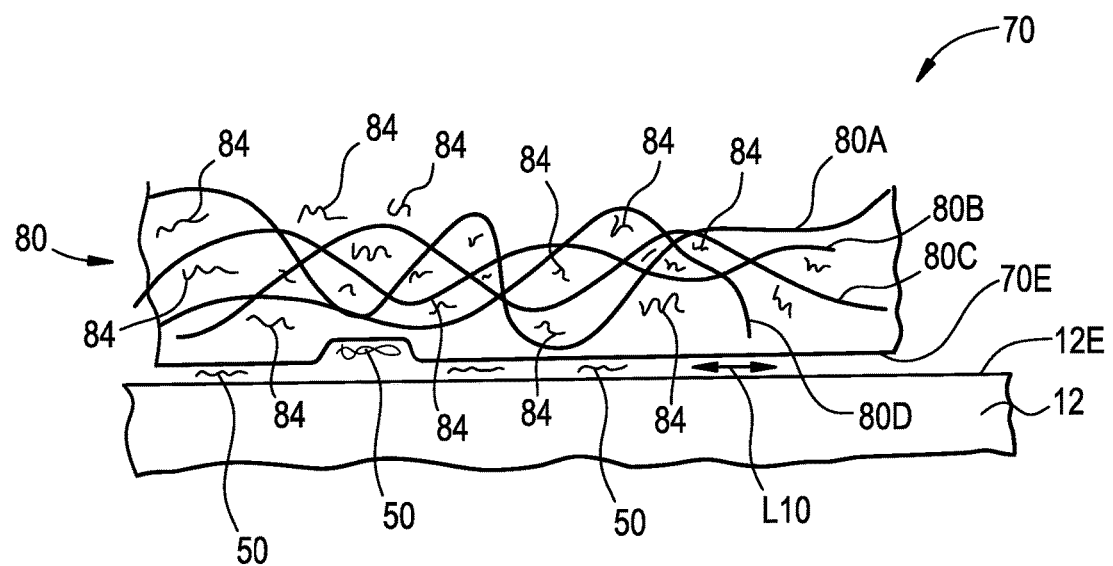
FIG. 4 is a schematic drawing of an enlarged cross section of the lubricious liner of the trunnion bearing of the present invention.

In one embodiment, as shown for example in FIG. 4, the lubricious liner 70 is a woven fabric 80. The woven fabric 80 includes a plurality of fibers 80A, 80B, 80C, and 80D interwoven with one another and polytetrafluoroethylene (PTFE) 84 interwoven therewith. The fibers 80A, 80B, 80C, and 80D include, for example, a polyester material, a stainless steel material, PTFE and/or glass material. The fibers 80A, 80B, 80C, and 80D interwoven with the PTFE enhance bondability of lubricous liner 70 to the second interior surface 14K of the outer ring 14 or the first exterior surface 12E of the inner ring 12. In one embodiment, PTFE fibers are dispersed in a resin that adheres the fibers 80A, 80B, 80C, and 80D together. In one example, the lubricious liner 70 is Lubron® TF woven PTFE fabric liner which is commercially available from Roller Bearing Company of America®, Oxford, Conn., United States. The lubricious liner 70 has properties and characteristics sufficient to withstand high loads with insignificant wear. In one embodiment, the liner 70 is not machinable, for example the liner 70 with the woven fabric 80. In one embodiment, the liner 70 is machinable, for example a moldable liner. It should be understood that the specific examples provided above are for illustration purposes only and are not intended to limit the present invention to any specific brand or type of lubricious liner.

Referring to FIGS. 1 and 3A, the trunnion bearing 10 includes a bushing 20 having a third exterior surface 20E and a third interior surface 20K that extend from a first axial end 20X to a second axial end 20Y of the bushing 20. The third exterior surface 20E has a contour complementary to that of the second interior surface 12K of the inner ring 12. The third exterior surface 20E engages the first interior surface 12K. In one embodiment, the bushing 20 is manufactured from a copper based alloy, such as, for example, CuNi₃Si according to NF L14-701/ASTM B411. The third interior surface 20K is substantially cylindrical and has a first lubricant reservoir 20R formed therein. In one embodiment, the first lubricant reservoir 20R is formed by a spiral groove 20G formed in the third interior surface 20K of the bushing 20. While the first lubricant reservoir 20R is shown and described as being a spiral groove 20G, the present invention is not limited in this regard as one or more grooves of any configuration may be employed. While the trunnion bearing 10 is shown and described in FIG. 1 as having the bushing 20, the present invention is not limited in this regard as other configuration are contemplated including those without the bushing 20, as shown for the trunnion bearing 110 of FIG. 6, described further herein.

In one embodiment, the inner ring 12 and the outer ring 14 are manufactured from the titanium alloy and the bushing 20 is manufactured from a copper based alloy.

Figure 3B:
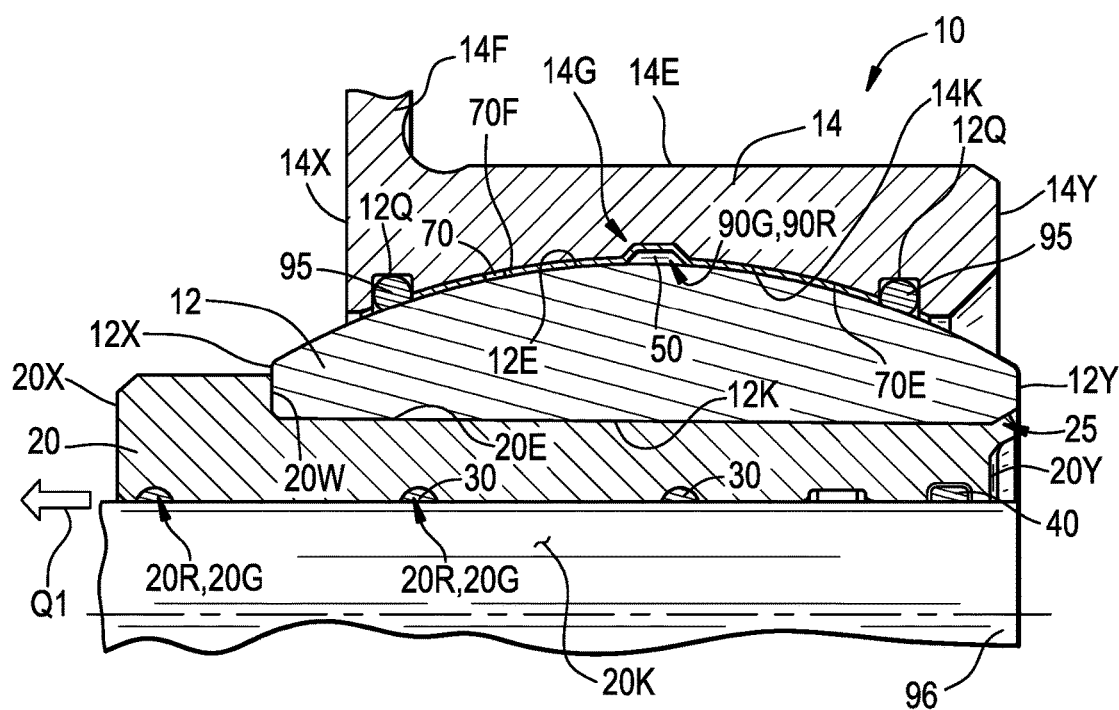
FIG. 3B is an enlarged cross sectional view of a portion of the trunnion bearing of FIG. 1 and shown with a shaft extending therethrough.

As best shown in FIG. 3A, the trunnion bearing 10 includes a wiper ring 40 disposed in the third interior surface 20K of the bushing 20, proximate the second axial end 20Y. The wiper ring 40 is configured to seal a lubricant 30 (e.g., lithium based grease) between the third interior surface 20K and a shaft (shown in FIG. 3B as element number 96) rotatingly mounted in the bushing 20. In one embodiment, the wiper ring 40 is manufactured from a fluorosilicone material. The bushing 20 is configured to have the lubricant 30 applied during assembly and replenished (e.g., supplied between the first axial end 20X and the second axial end 20Y) as necessary after assembly and during use of the trunnion bearing 10. Excess amounts of the lubricant 30 can be discharged out of the bushing 20 at the first axial end 20X as indicated by the arrow Q1.

As shown in FIG. 3A the inner ring 12 is secured to the bushing 20 by staking 25. While the inner ring 12 is described as being secured to the bushing 20 by staking 25, the present invention is not limited in this regard as the inner ring 12 may be secured to the bushing 20 by swaging, staking, pinning, thermal fitting and/or interference press fitting. As best shown in FIG. 3A, the bushing 20 includes a shoulder 20W located proximate the first axial end 20X. The shoulder 20W extends radially outward from the third exterior surface 20E. The first axial end 12X of the inner ring 12 abuts the shoulder 20W.

Figure 3C:
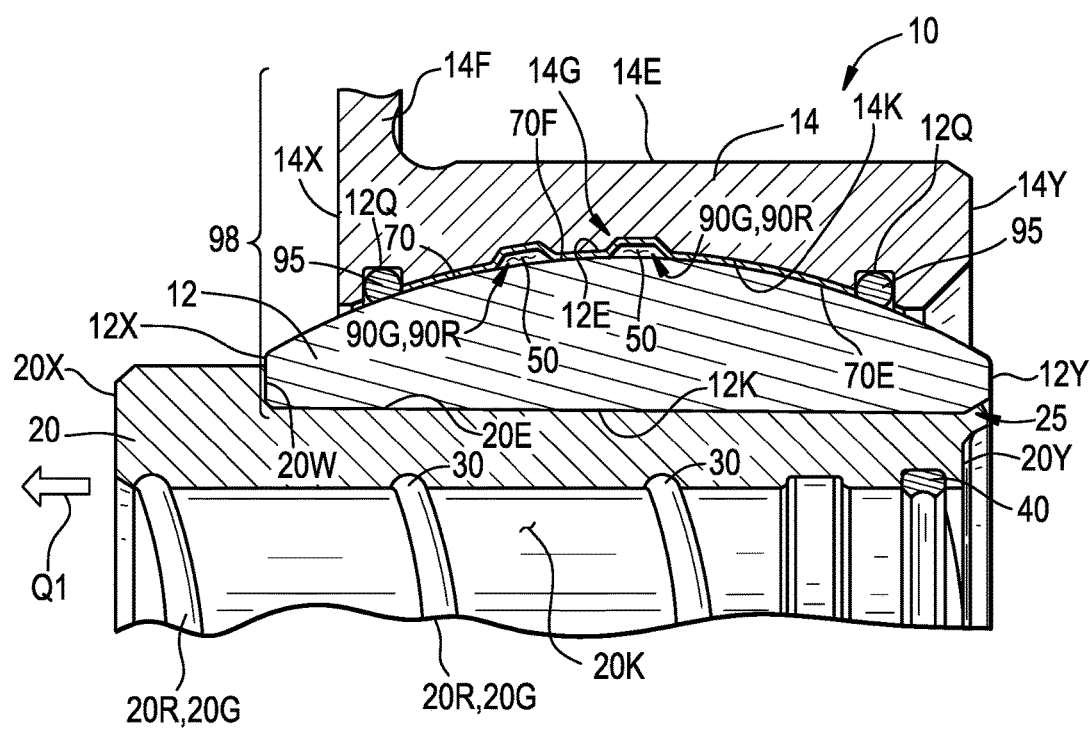
FIG. 3C is an enlarged cross sectional view of a portion of the trunnion bearing of FIG. 1 shown with two recesses in the lubricious liner.
Figure 5:
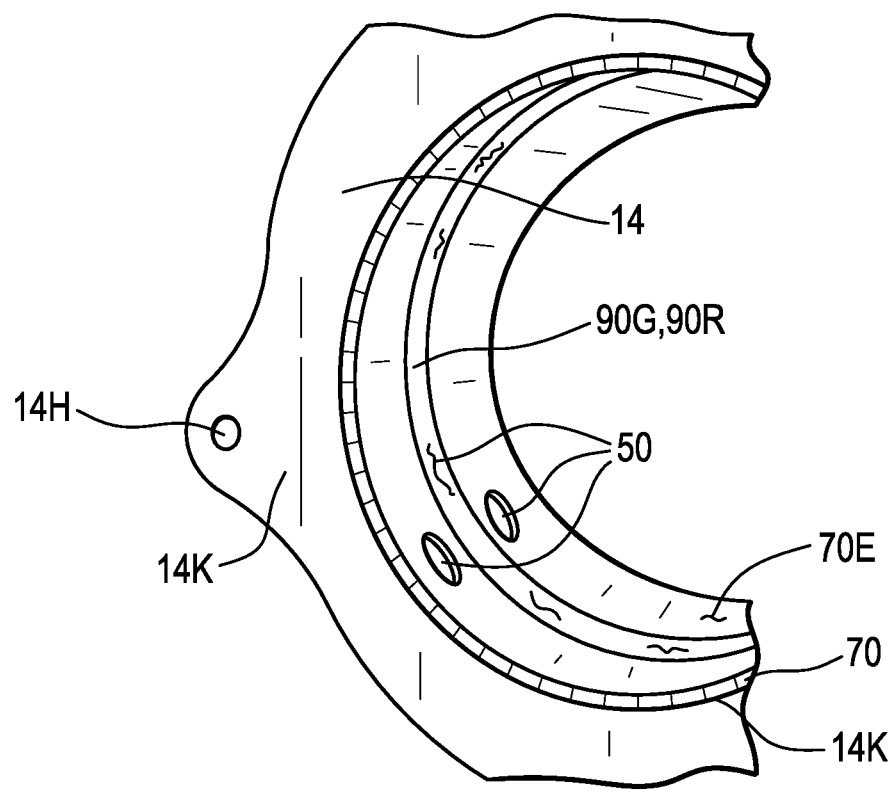
FIG. 5 is a perspective view of a portion of the outer ring of the trunnion bearing of FIG. 1.

As shown in FIGS. 3A and 5, the outer ring 14 includes a circumferential groove 14G formed in the second interior surface 14K. The lubricious liner 70 is secured in the groove 14G thereby forming a recess 90G (e.g., a groove) in the lubricious liner 70. The recess 90G is configured as a second lubricant reservoir 90R for dispensing a second lubricant 50 (e.g., silicone grease) between the lubricious liner 70 and the first exterior surface 12E of the inner ring 12. The lubricant 50 is disposed between the first exterior surface 12E of the inner ring 12 and the lubricious liner 70. The inventors have surprisingly discovered that the recess 90G and second reservoir 90R can advantageously be formed in the lubricious liner 70 and although it has been long recognized that lubricious liners do not need a further lubricant and that the recess 90G in the lubricious liner 70 has surprising utility in functioning as the second reservoir 90R for the second lubricant 50 and a trap for debris. The first and second lubricants 30, 50, respectively, may be the same or of different formulations. The inventors have surprisingly found that the second lubricant 50 may be disposed in the second lubricant reservoir 90R only once during assembly without the need for a grease replenishment system (e.g., lubrication holes) over the life of the trunnion bearing 10. In one embodiment, the lubricious liner 70 has one or more recesses 90G to form one or more second reservoirs 90R. For example, an embodiment of the present invention is shown with two recesses 90G and two second reservoirs 90R in FIG. 3C. The inventors have discovered that the trunnion bearing 10 disclosed herein provides maintenance free operation (e.g., the second lubricant 50 is added to the trunnion bearing 10 only during the initial assembly thereof) for an extended life compared to prior art bearings, without the need to replenish the second lubricant 50 (e.g., silicon grease) and is configured to misalignment of the inner ring 12 relative to the outer ring 14 with a lower friction and decreased torque compared to the prior art bearings, and thus increases the fatigue life of the airframe structure in which the trunnion bearing 10 is installed. The trunnion bearing 10 is also of a lighter weight than the prior art bearings and is therefore more suitable for use in aircraft landing gear where weight reduction is an important design consideration.

As shown in FIGS. 1 and 3A, the trunnion bearing 10 includes a seal 95 (e.g., an O-ring) that is seated in each of two grooves 12Q, each located proximate the first end 14X and the second end 14Y of the outer ring 14. Each of the seals 95 are in sliding and sealing engagement with surfaces of the respective groove 12Q in the outer ring 14 and/or with first exterior surface 12E of the inner ring 12. In one embodiment, the seals 95 are manufactured from a fluoro-silicone material.

As shown in FIG. 3A, the trunnion bearing 10 is configured as maintenance free in that no paths, ports, lubrication supply openings or conduit, fittings, conduits or passages are provided in the outer ring 14, the inner ring 12 or between the inner ring 12 and the outer ring 14 for the replenishment of the second lubricant 50 from outside the trunnion bearing 10 into second lubricant reservoir 90R, the recess 90G or elsewhere between the liner 70 and the inner ring 12. Instead, the liner 70, the outer ring 14, the inner ring 14 and the seals 95 are a barrier 98 for external replenishment and/or discharge of the second lubricant 50 from the trunnion bearing 10. The second reservoir 90R is configured as an internal dispensing system that contains a sufficient quantity of the second lubricant 50 for dispensing to the liner 70 for the entire life of the trunnion bearing 10, after the manufacture and assembly of the trunnion bearing 10. The second reservoir 90R is configured as an internal dispensing system that contains a sufficient quantity of the second lubricant 50 for dispensing to the liner 70 for the entire life of the trunnion bearing 10, after the manufacture and assembly of the trunnion bearing 10.

As shown in FIG. 4, the second lubricant 50 is distributed (e.g., spread over the surface 70E of the liner 70 and the first exterior surface 12E of the inner ring 12, as indicated by arrow L10, for example) via the second reservoir 90R by movement, rotation, vibration, temperature differential, heating, cooling and/or misalignment of the inner ring 12 relative to the outer ring 14. The second lubricant 50 is therefore disposed on and between the surface 70E of the liner 70 and the first exterior surface 12E of the inner ring 70, but is not infused, impregnated, contained in or added to the liner 70 or the inner ring 12 or outer ring 14. In one embodiment, the second lubricant 50 is disposed on the disposed on and between the surface 70E of the liner 70 and the first exterior surface 12E of the inner ring 70 at a thickness greater than 0.005 inches. In one embodiment, the second lubricant 50 is disposed on the disposed on and between the surface 70E of the liner 70 and the first exterior surface 12E of the inner ring 70 at a thickness greater than 0.007 inches. In one embodiment, the second lubricant 50 is disposed on the disposed on and between the surface 70E of the liner 70 and the first exterior surface 12E of the inner ring 70 at a thickness greater than 0.008 inches.

Figure 6:
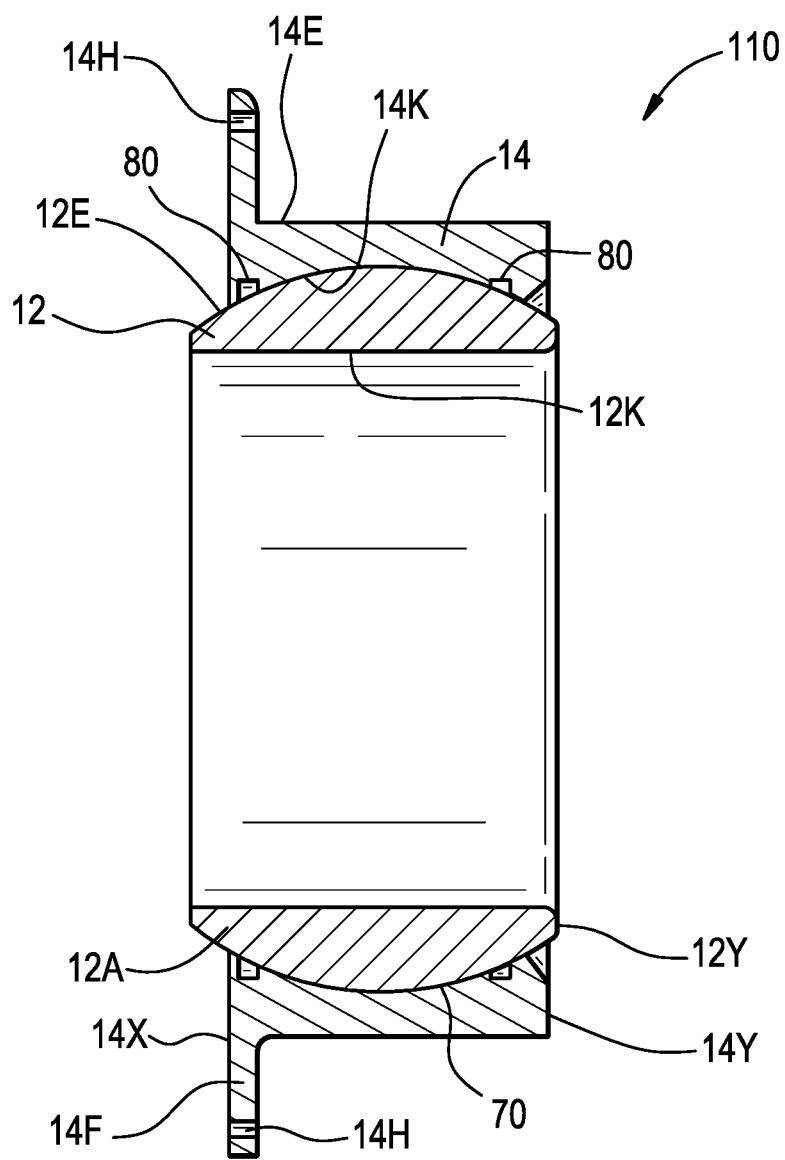
FIG. 6 is a cross sectional view of the trunnion bearing of the present invention without a bushing.

As shown in FIG. 6, the trunnion bearing 110 includes the inner ring 12 that has the first exterior surface 12E and the first interior surface 12K; and the outer ring 14 that has the second interior surface 14K and the second exterior surface 14E, but the bushing 20 is optional or eliminated. A portion of the inner ring 12 is disposed in the outer ring 14. The lubricious liner 70 is disposed between the first exterior surface 12E of the inner ring 12 and the second interior surface 14K of the outer ring 14. The outer ring includes the groove 14G formed in the second interior surface 14K and the liner 70 is secured in the groove 14G and the second interior surface 14K thereby forming the recess 90G in the lubricious liner 70. The recess 90G is configured as a lubricant reservoir 90R for dispensing the lubricant 50 (e.g., silicone grease) between the lubricious liner 70 and the first exterior surface 12E of the inner ring 12.

Although the invention has been described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. A trunnion bearing comprising:
an inner ring having a first exterior surface and a first interior surface, the first exterior surface having a spherical contour;
an outer ring having a second interior surface and a second exterior surface, the second interior surface having a spherical contour;
the inner ring being disposed at least partially in the outer ring;
a lubricious liner being disposed between the first exterior surface of the inner ring and the second interior surface of the outer ring; and
a bushing having a third exterior surface and a third interior surface, the third exterior surface having a contour complementary to that of the first interior surface of the inner ring, the third exterior surface engaging the first interior surface, the third interior surface being substantially cylindrical and having a least one first lubricant reservoir formed therein, the at least one first lubricant reservoir being configured to dispense a first lubricant therefrom;
at least one recess in the lubricious liner, the at least one recess being configured as a second lubricant reservoir for dispensing a second lubricant between the lubricious liner and the first exterior surface of the inner ring;
at least one seal that is in sealing engagement with the inner ring and the outer ring; and
wherein the first lubricant is different from the second lubricant.

2. The trunnion bearing of claim 1, wherein the lubricious liner is secured to the second interior surface of the outer ring and the lubricious liner is in sliding engagement with the first exterior surface of the inner ring.

3. The trunnion bearing of claim 1, wherein the at least one first lubricant reservoir comprises at least one groove formed in the third interior surface of the bushing.

4. The trunnion bearing of claim 3, wherein the at least one groove is of a spiral configuration.

5. The trunnion bearing of claim 1, further comprising a wiper ring disposed in the third interior surface of the bushing, the wiper ring being configured to seal a first lubricant between the third interior surface and a shaft rotatingly mounted in the bushing.

6. The trunnion bearing of claim 1, wherein the inner ring is a split ring having at least two axial splits creating at least a first inner ring segment and a second inner ring segment that are abutted against one another.

7. The trunnion bearing of claim 1, wherein the inner ring is manufactured from a titanium alloy.

8. The trunnion bearing of claim 1, wherein the outer ring is manufactured from a titanium alloy.

9. The trunnion bearing of claim 1, wherein the bushing is manufactured from a copper based alloy.

10. The trunnion bearing of claim 1, wherein at least a portion of the inner ring is coated with a titanium nitride material.

11. The trunnion bearing of claim 10, wherein the titanium nitride material is applied via a physical vapor deposition process.

12. The trunnion bearing of claim 1, wherein the inner ring is secured to the bushing via at least one of swaging, staking, pinning, thermal fitting and interference press fitting.

13. The trunnion bearing of claim 1, wherein the second lubricant comprises a silicone grease.

14. The trunnion bearing of claim 1, wherein the at least one seal is an O-ring.

15. The trunnion bearing of claim 1, further comprising a circumferential groove formed in the second interior surface of the outer ring and wherein the lubricious liner is secured in the groove thereby forming the at least one recess in the lubricious liner.

* * * * *